June 4, 1957  J. A. ANDERSON  2,794,657
EXTENSIBLE HITCHES FOR TRAILERS WITH AUTOMATIC
LATCHING MEANS FOR RETRACTED POSITION
Filed Aug. 5, 1954  2 Sheets-Sheet 2
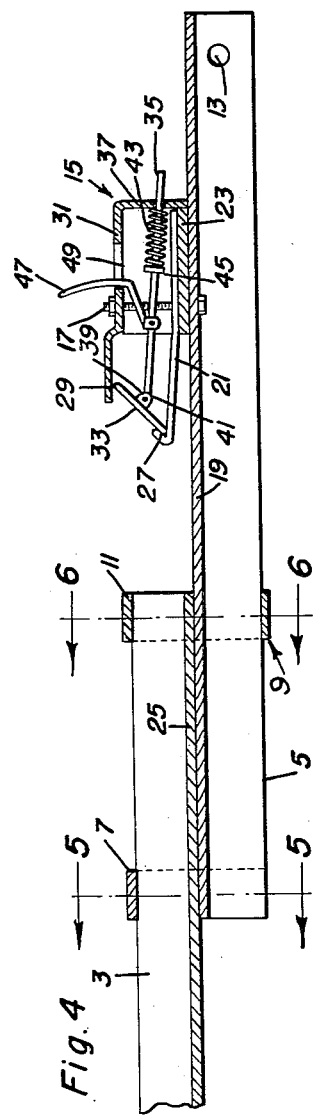
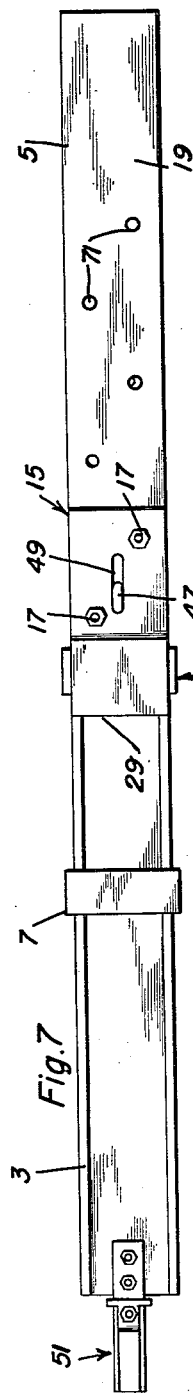
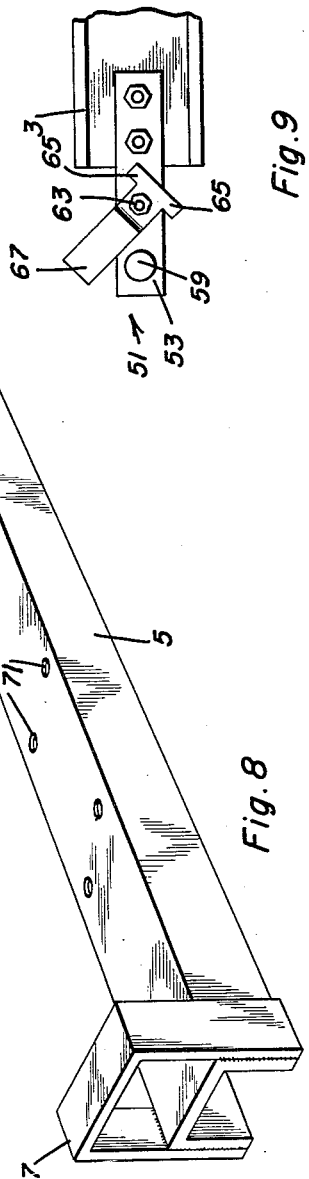
John A. Anderson
INVENTOR.

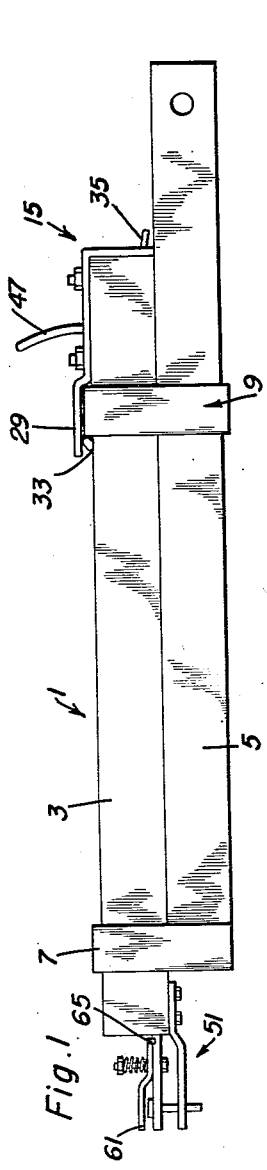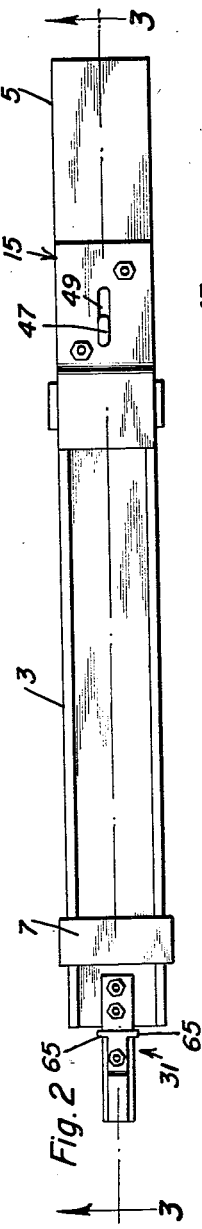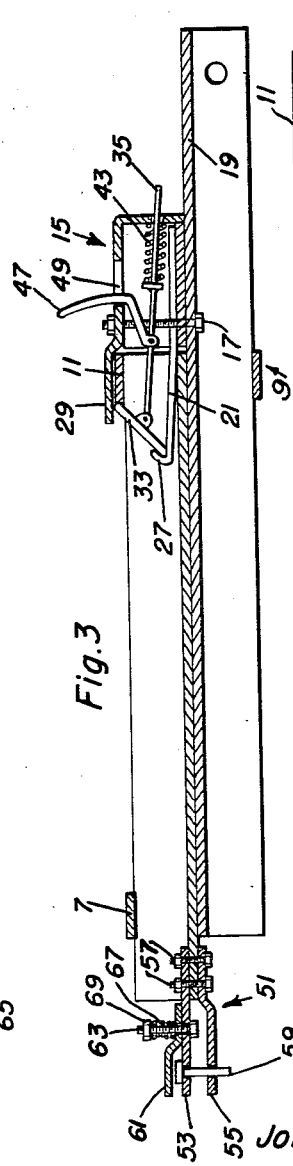
John A. Anderson
INVENTOR.

_(2,794,657 — Patented June 4, 1957)_

2,794,657

EXTENSIBLE HITCHES FOR TRAILERS WITH AUTOMATIC LATCHING MEANS FOR RETRACTED POSITION

John A. Anderson, Ortonville, Minn.

Application August 5, 1954, Serial No. 447,975

2 Claims. (Cl. 280—477)

My invention relates to improvements in trailer hitches of the extensible draft tongue type.

The primary object of my invention is to provide a hitch of the type indicated formed of a pair of sliding sections for extending and contracting the hitch and to provide secure snap action means for locking the sections together in the extended or contracted position of the hitch.

Another object is to provide a hitch embodying the above features which is very simple in construction, safe to use, and inexpensive to manufacture and install on conventional trailers.

Other and subordinate objects, together with the precise nature of my improvements will become readily apparent when the following description and claims are read with reference to the accompanying drawings in which:

Figure 1 is a view in side elevation of my improved hitch contracted to its shortest length and the sections locked together;

Figure 2 is a view in plan of the same;

Figure 3 is a view in vertical longitudinal section taken on the line 3—3 of Figure 2;

Figure 4 is a view in longitudinal vertical section showing the sections unlocked and the hitch extended for hitching to a tow vehicle;

Figure 5 is a view in transverse section taken on the line 5—5 of Figure 4;

Figure 6 is a view in transverse section taken on the line 6—6 of Figure 4;

Figure 7 is an enlarged view in plan showing the hitch extended and the sections locked together;

Figure 8 is a perspective view of one of the sections of the hitch, and

Figure 9 is a fragmentary enlarged view in plan of the front end of one of the hitch sections and coupling means therein.

Referring to the drawings by numerals, my improved hitch comprises a draft tongue 1 including a pair of upper and lower channel bar sections 3, 5 opposed back to back and relatively slidable longitudinally to extend and contract the tongue respectively. The sections 3, 5 may be of any suitable length.

A U-shaped strap iron guide yoke 7 upstanding from and straddling the front end of the lower section 5 is suitably fixed to said lower section and straddles the upper section 3 to guide said sections in relative longitudinal movement thereof. A rectangular strap iron guide yoke 9 is suitably secured on the rear end of the upper section 3 in surrounding relation to both sections for the same purpose as yoke 7. The top 11 of the yoke 9 extends flatly across and bridges the channel of the upper section 3 to form part of the snap action locking means presently to be fully described. Transverse apertures 13 in the rear end of the lower section 5 provide for tiltably bolting the tongue 1 to a trailer, not shown.

The remainder of the locking means comprises a rectangular open front housing 15 in the rear of the top section 3 bolted as at 17 on the top 19 of the lower section 5. A flat resilient locking arm 21 is suitably secured in the housing 15 to the bottom 23, thereof and inclines upwardly and forwardly out of the front end of said housing to extend into the rear end of the upper section 3 and overlie the bottom 25 of said section for vertical flexing in said section 3 for a purpose presently seen. The locking arm 21 is provided with a rearwardly and upwardly inclined front catch lip 27.

The housing 15 forms a stop on top of the lower section 5 for engagement by the rear end of the upper section to limit rearward sliding of said upper section 3. A vertically offset horizontal keeper lip 29 extends forwardly from the top 31 of the housing 15 to overlie and extend forwardly of the top 11 of yoke 9 when the top section 3 is slid rearwardly into engagement with the housing 15. In this position of the upper section 3 the sections 3, 5 are in locking position and the top 11 forms a locking detent.

A locking plate 33 tilting vertically on the arm 21 inclines upwardly and rearwardly between said arm 21 and lip 29 behind the catch lip 27 so that it is prevented from tilting forwardly from a locking position shown in Figures 3 and 4. When the upper section 3 is slid rearwardly, the top 11 of the yoke 9 engages and tilts the locking plate rearwardly on arm 21 out of locking position and wipes over said plate to a position behind the same, shown in Figures 3 and 4, and the plate is then tilted forwardly and returned to locking position, with a snap action, in front of said top, by means described in the following, to lock the sections 3, 5 together against relative sliding.

The return means for the locking plate comprises a horizontal slide rod 35 slidable forwardly in the rear end 37 of the housing 15 with a front end pivoted, as at 39, to a center lug 41 on the locking plate 33 and is spring-loaded for forward sliding by a coil spring 43 thereon in the housing 15 interposed between a collar 45 on said rod and the rear end 37 of housing 15.

A hand lever 47 on the rod 35 extending upwardly through a slot 49 in the top 31 of housing 15 provides for retracting the rod to tilt or rock the locking plate 33 rearwardly into unlocking position in which it clears the top 11 of yoke 9 to free said yoke for sliding of the top section 3 forwardly.

A coupling clevis 51 is provided on the front end of the upper section 3 for coupling the tongue to the draw bar, not shown, of a tow vehicle. The clevis 51 comprises upper and lower bars 53, 55 bolted as at 57 to the bottom of upper section 3 and having a coupling pin 59 extending therethrough. A keeper bar 61 for retaining the coupling pin 59 in place is pivoted on an upstanding pin 63 on the upper bar 53 for swinging to overlie said coupling pin 59. A pair of side edge lugs 65 on said keeper bar 61 engage the side edges of the upper bar 53 to retain said keeper bar 61 in overlying position. The keeper bar 61 is slidable upwardly to free the lugs 65 for swinging of said bar 61 from overlying position so that the coupling pin 59 can be removed and replaced. A coil spring 67 on the pin 59 backed by a nut 69 on said pin tensions said keeper bar 61 against upward movement.

The lower section 5 is provided with longitudinally spaced pairs of bolt holes 71 in its top 19 and a pair of the bolts 17 are provided for the housing so that the housing may be adjusted into different positions along the top section 5 whereby the sections 3, 5 may be variably slid to variably contract the tongue 1 and locked together when the tongue is contracted into selected position.

As will be understood to couple the upper section 3 to a tractor, the upper section is unlocked and slid forwardly on the lower section 5 and the upper section 3 then backed on the lower section 5 to the housing 15 whereupon it is automatically locked to said housing and hence to the lower section 5.

The foregoing will, it is believed, suffice to impart a clear understanding of my invention without further explanation.

What is claimed as new is as follows:

1. A trailer hitch comprising a pair of upper and lower bars relatively slidable endwise on each other forwardly and rearwardly to vary the length of the hitch, said lower bar having a rear end adapted to be connected to a trailer, the upper bar having a front end provided with coupling means adapted for coupling to a tow vehicle, said upper bar having a rear end provided with an upwardly opening channel, a yoke on said upper bar guiding the same during rearward sliding thereof and movable rearwardly therewith, a stop on the lower bar behind said upper bar to establish a rearward limit of sliding movement of said upper bar, and means for locking said upper bar in its rearward limit of movement comprising a vertically inclined locking plate in front of said stop, tiltable into and from a locking position, said yoke bridging said channel and wiping rearwardly over said plate to tilt the same from locking position when the upper bar is moved into its rearward limit of movement, an arm extending from said stop into said channel and on which said plate is tiltable and a spring loaded rod slidable in said stop and pivoted to said plate to permit tilting of said plate from locking position and acting to swing said plate into locking position.

2. The combination of claim 1, and a hand lever on said rod manipulative for sliding said rod to move said plate into unlocking position.

References Cited in the file of this patent
UNITED STATES PATENTS

| | | |
|---|---|---|
| 2,366,294 | Stringer | Jan. 2, 1945 |
| 2,384,244 | Forney | Sept. 4, 1945 |
| 2,415,478 | Forney | Feb. 11, 1947 |
| 2,417,646 | Hallner | Mar. 18, 1947 |
| 2,523,591 | Potter | Sept. 26, 1950 |